United States Patent
Haran

(10) Patent No.: US 12,497,039 B2
(45) Date of Patent: Dec. 16, 2025

(54) METHOD AND APPARATUS FOR TRAFFIC-AWARE SPEED GUIDANCE BASED ON V2X COMMUNICATIONS

(71) Applicant: AUTOTALKS LTD., Kfar Netter (IL)

(72) Inventor: Onn Haran, Kfar Netter (IL)

(73) Assignee: AUTOTALKS LTD., San Diego, CA (US)

( * ) Notice: Subject to any disclaimer, the term of this patent is extended or adjusted under 35 U.S.C. 154(b) by 562 days.

(21) Appl. No.: 17/829,979

(22) Filed: Jun. 1, 2022

(65) Prior Publication Data

US 2023/0391326 A1 Dec. 7, 2023

(51) Int. Cl.
| | |
|---|---|
| *B60W 30/14* | (2006.01) |
| *B60W 30/095* | (2012.01) |
| *B60W 30/16* | (2020.01) |
| *B60W 40/04* | (2006.01) |
| *B60W 40/105* | (2012.01) |
| *B60W 60/00* | (2020.01) |
| *H04W 4/44* | (2018.01) |

(52) U.S. Cl.
CPC ...... *B60W 30/143* (2013.01); *B60W 30/0956* (2013.01); *B60W 30/16* (2013.01); *B60W 40/04* (2013.01); *B60W 40/105* (2013.01); *B60W 60/001* (2020.02); *H04W 4/44* (2018.02); *B60W 2554/408* (2020.02); *B60W 2554/80* (2020.02); *B60W 2555/60* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 2009/0171546 A1* | 7/2009 | Tozuka | B60K 31/04 701/1 |
| 2018/0178787 A1* | 6/2018 | Gutmann | B60W 50/06 |
| 2019/0308617 A1* | 10/2019 | Groult | B60Q 1/543 |
| 2024/0177535 A1* | 5/2024 | Duser | G09B 9/05 |

* cited by examiner

*Primary Examiner* — Madison R. Inserra
(74) *Attorney, Agent, or Firm* — AUTOTALKS LTD.

(57) ABSTRACT

Method and apparatus for traffic-aware speed guidance to a self-vehicle acting as a following vehicle vs. a followed vehicle. In a traffic environment that includes a followed vehicle and a self-vehicle that acts as a following vehicle, the apparatus is used to analyze values and change patterns of a plurality of speed inputs to obtain analyzed values, wherein a speed input of the followed vehicle is received through vehicle-to-everything (V2X) communications; to calculate, for each analyzed value, a respective TTC adjustment, to calculate a combined TTC between the self-vehicle and the followed vehicle using the TTC adjustments, and, based on the combined TTC, to calculate a new speed guidance between the self-vehicle and the followed vehicle, thereby improving traffic behavior.

16 Claims, 6 Drawing Sheets

METHOD AND APPARATUS FOR TRAFFIC-AWARE SPEED GUIDANCE BASED ON V2X COMMUNICATIONS

FIELD

Embodiments disclosed herein relate generally to traffic-aware speed guidance based on vehicle-to-everything (V2X) communications, and in particular to maximizing vehicle speed while adapting the V2X-based speed guidance to behavior of other vehicles on road.

BACKGROUND

Cooperative Adaptive Cruise Control (CACC) is a well-studied concept (including a mathematical model and algorithm) to coordinate the speed of vehicles in a platoon for smoothing speed variances during driving. Vehicles exchange their speed, location, heading, and other parameters using V2X communication messages, and a vehicle can adjust its speed based on the speeds of vehicles ahead even if those are not visible.

FIG. 1 illustrates a scenario for known CACC operation. Four vehicles are driving in a lane. A "followed" vehicle is defined as the vehicle with V2X closest to and ahead of a self-vehicle in the same lane, but not the one immediately ahead of the self-vehicle. The vehicle immediately ahead of the self-vehicle in the same lane is a "vehicle ahead". For example, if both vehicles 104 and 102 have V2X, then vehicle 108 would consider vehicle 104 to be the followed vehicle, while vehicle 104 is a vehicle ahead of vehicle 106. If only vehicle 102 has V2X, then it would be considered by vehicle 108 to be the followed vehicle.

Vehicle 108 adjusts its speed based on speed information received from vehicle 102, for smoothing traffic flow and minimizing hard braking events. Because of the speed information received through V2X, braking of vehicle 102 will immediately impact the speed of vehicle 108 without waiting for vehicle 106 to brake.

The smoothing of traffic flow can contribute to lower Internal Combustion Engine (ICE) fuel consumption, increased Electrical Vehicle (EV) range, fewer and shorter traffic jams, and overall faster roads. Despite the great promise, carmakers do not have concrete plans to deploy CACC, because it is limited. In real life, only a few vehicles have V2X, requiring CACC to operate in a mixed environment, with varying roads, varying driving styles, varying traffic conditions and varying V2X penetration. A driving style is reflected in the distance a driver keeps from the vehicle ahead. For example, assume vehicle 104 keeps a short gap from vehicle 102, while vehicle 106 keeps a longer gap from vehicle 104. Should vehicle 102 brake, vehicle 104 will react by breaking harder, resulting in a significant slowdown. On the other hand, should vehicle 104 brake, vehicle 106 can react moderately and not brake below the speed of vehicle 104.

Effective CACC operation would require knowing the number of vehicles and the spacing between following and followed vehicles. If the traffic density is higher than assumed by the mathematical model of the CACC, then the initial speed decrease of the following vehicle is not sufficient, if later it is forced to further decrease its speed. The main goal of CACC is to decrease speed moderately, so later, once the vehicle ahead brakes, the following vehicle would not have to reduce speed dramatically, which would impact the traffic flow. The entire idea is to smooth braking. If the initial speed recommendation did not anticipate that a further speed decrease would be needed, then it is not a good recommendation. If the traffic density is lower than assumed by the mathematical model, then the following vehicle has decreased the speed below needed, again creating a speed drop for other vehicles on the road. The CACC cannot work effectively, as it is defined today without considering the impact of other vehicles on road.

There is therefore a need for, and it would be advantageous to have traffic-aware speed guidance based on V2X communications. In contrast with CACC, in such traffic-aware speed guidance, a speed guidance algorithm takes into account the amplitude of speed changes resulting from traffic density and reaction of drivers, therefore adjusting the speed guidance based on traffic.

SUMMARY

Disclosed herein is a method and apparatus (system) for traffic-aware speed guidance scheme based on V2X messages. The scheme sets the optimal vehicle speed, improves fuel consumption, increases EV range, improves safety, shortens travel time, and increases overall road capacity.

Disclosed herein is a method and apparatus (system) for traffic-aware speed guidance scheme based on V2X messages. The scheme sets the optimal vehicle speed, improves fuel consumption, increases EV range, improves safety, shortens travel time, and increases overall road capacity.

In various embodiments there is provided a method, comprising: in a traffic environment that includes a followed vehicle and a self-vehicle that acts as a following vehicle, analyzing values and change patterns of a plurality of speed inputs to obtain analyzed values, wherein a speed input of the followed vehicle is received through V2X communications; for each analyzed value, calculating a respective TTC adjustment; calculating a combined TTC between the self-vehicle and the followed vehicle using the TTC adjustments; and based on the combined TTC, calculating a new speed guidance between the self-vehicle and the followed vehicle, thereby improving traffic behavior.

In some embodiments, the plurality of speed inputs includes a speed of the self-vehicle and a speed of a vehicle ahead.

In some embodiments, the speed of the vehicle ahead is measured by sensors of the self-vehicle.

In some embodiments, the calculating of a respective TTC adjustment includes calculating a driver compliance TTC adjustment.

In some embodiments, the calculating of a respective TTC adjustment includes calculating a road speed fluctuation TTC adjustment.

In some embodiments, the calculating of a respective TTC adjustment includes calculating a guidance quality TTC adjustment.

In some embodiments, the calculating of a respective TTC adjustment includes calculating a vehicle ahead speed TTC adjustment.

In various embodiments there is provided an apparatus installed in a self-vehicle acting as a following vehicle vs. a followed vehicle, comprising: a V2X communication unit; a traffic-aware speed guidance unit that includes a first analyzer configured to analyze stability of road speed on a road and to calculate a road speed fluctuation TTC adjustment using at least one speed input received from the followed vehicle through V2X communications, a second analyzer configured to analyze a speed guidance and to calculate a guidance quality TTC adjustment, and a third analyzer configured to analyze the self-vehicle speed and a vehicle ahead speed and to calculate a vehicle ahead speed TTC adjustment; and a speed guidance combiner unit configured to calculate a combined TTC between the self-vehicle and the followed vehicle using at least some of the TTC adjustments, and to calculate a new speed guidance of the self-vehicle based on the combined TTC, thereby improving traffic behavior.

In some embodiments, at least some of the TTC adjustments used by the speed guidance unit include the road speed fluctuation TTC adjustment.

In some embodiments, the apparatus further comprises a fourth analyzer configured to analyze a self-vehicle speed and a target speed and to calculate a driver compliance TTC adjustment.

In some embodiments, the apparatus further comprises comprising an Adaptive Cruise Control (ACC) unit for providing ACC speed guidance to the speed guidance combiner unit.

In various embodiments there is provided non-transitory computer-readable medium including instructions executed by a processor in a self-vehicle that acts as a following vehicle to a followed vehicle, to perform a method as described above or below.

BRIEF DESCRIPTION OF THE DRAWINGS

Non-limiting examples of examples disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify Examples disclosed herein and should not be considered limiting in any way. In the drawings.

DETAILED DESCRIPTION

Embodiments disclosed herein disclose apparatus and methods that maximize vehicle speed in traffic. They reflect a concept based on knowing and using the speed of a vehicle further away from a self-vehicle (also known as "ego-vehicle") received through V2X communication and the traffic on road. All references to "driver" below refer to a driver of the self-vehicle. One idea is to use "long-term" time-to-collision (TTC) values for speed guidance, and to adjust a TTC value based on analyzing driver compliance with speed guidance, road speed fluctuations, speed guidance quality and relative speed between that of the self-vehicle and of the vehicle ahead. The concept can be applied when the driver controls the vehicle speed or when the speed is controlled by a vehicle advanced driving system (ADAS). In the following, "TTC" and "TTC value" are used interchangeably. When used hereinafter, TTC refers to the time-to-collision between the self (following)-vehicle and the followed vehicle.

In known art, what can be referred to as "regular" TTC is typically 3-4 seconds ("sec"). In this disclosure, "long-term TTC" may be for example greater 20 seconds. Unlike a regular TTC, which deals with imminent risk, a long-term TTC is not related to a real safety risk, since risks 20 seconds away can be easily avoided.

Unless stated otherwise, the units for various speed parameters are [m/sec], and for TTC and TTC adjustments are [sec].

Figure 1:
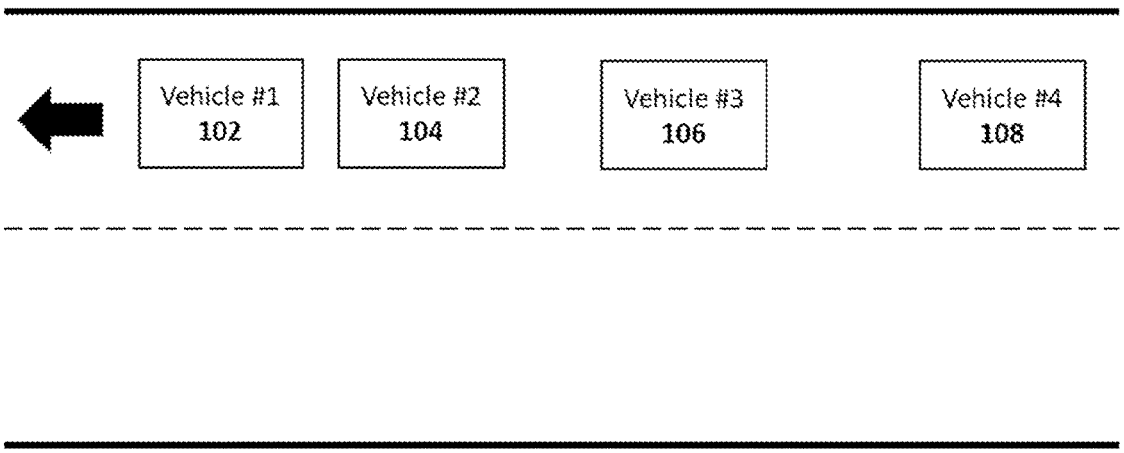
FIG. 1 illustrates a scenario for known CACC operation.
Figure 2:
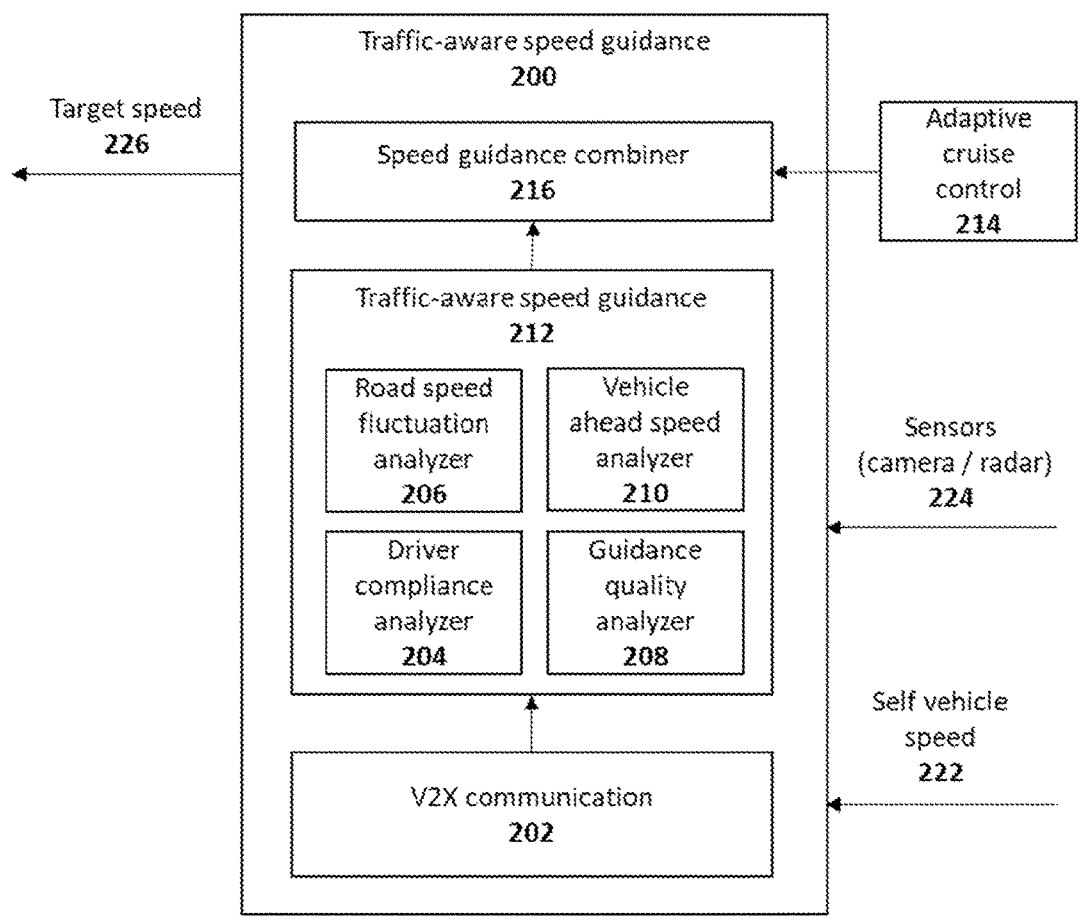
FIG. 2 illustrates in a block diagram an embodiment of a traffic-aware V2X speed guidance system (apparatus) disclosed herein.

FIG. 2 illustrates in a block diagram an embodiment of a traffic-aware V2X speed guidance system (apparatus) disclosed herein and numbered 200. The system is implemented in a self-vehicle that acts as a following vehicle. To clarify, any following vehicle that has a system like system 200 can act as a self-vehicle for purposes described herein. System 200 comprises a V2X communication unit 202, a traffic-aware speed guidance unit 212 that includes a driver compliance analyzer 204, a road speed fluctuation analyzer 206, a guidance quality analyzer 208 and a vehicle ahead speed analyzer 210. In exemplary embodiments, V2X communication unit 202 includes hardware (HW) and software (SW) components, while guidance unit 212 (with its analyzers) is implemented in software. System 200 further comprises a speed guidance combiner unit 216. The self-vehicle may optionally include an ACC unit 214 that operates based on vehicle sensors 224 such as cameras or radars/LIDARs, and which provides ACC speed guidance to speed guidance combiner 216.

V2X communication unit 202 includes a V2X radio, a modem, a security module, and a software stack (not shown) and is operative to transmit and receive messages according to global standards. The V2X information received from the followed vehicle is fed to road speed fluctuation analyzer 206 and traffic-aware speed guidance unit 212.

In some embodiments, to improve the flow of traffic, driver compliance analyzer 204 is configured to check if the driver chooses to drive at a higher speed than a speed guidance ("target speed") that can be lower than the speed limit. Analyzer 204 is operative only when the driver has control over the vehicle's speed. If the ACC is activated and the driver does not control the speed, then the speed guidance is adopted, and hence analyzer 204 will not contribute any insights. If the driver tends to increase the speed above the speed guidance, then the speed guidance to the driver who just increased the speed above the guidance should be less strict, hence the TTC should be shorter. That is, longer TTC lowers the speed guidance and shorter TTC increases the speed guidance. If the speed guidance is not respected, the driver preferences should be weighted, and TTC should decrease to increase the speed of future guidance, as the driver would be more likely to respect such increased speed guidance. The inputs to driver compliance analyzer 204 are self-vehicle speed 222 and target speed 226. The output of driver compliance analyzer 204 is a first adjustment (and adjusted value) of TTC.

Figure 3:
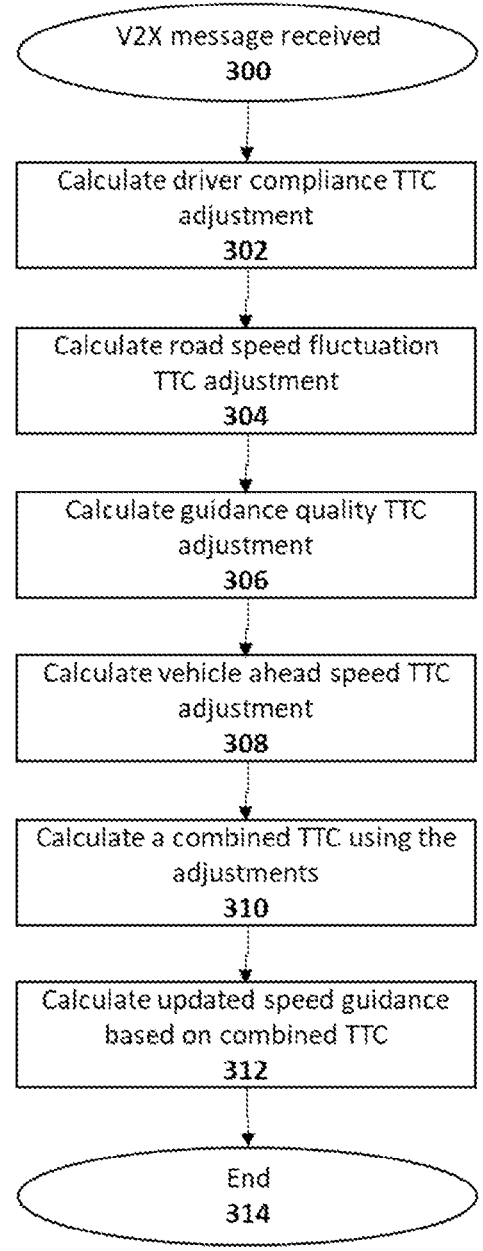
FIG. 3 illustrates a flow chart of a method for traffic-aware V2X speed guidance disclosed herein.

Road speed fluctuation analyzer 206 is configured to check the stability of road speed on road (see step 304 in FIG. 3). Frequent speed changes indicate dense and unstable traffic, which can often lead to significant slowdowns. In case the road speed on road is unstable, i.e. there are frequent speed changes, an earlier alert for braking, meaning higher TTC, is needed for the self-vehicle. The inputs to analyzer 206 are the speeds of the vehicles on the road, of self-vehicle 222, of the vehicle ahead (the latter measured by sensors 224), and the followed vehicle. The output of road speed fluctuation analyzer 206 is a second adjustment (and adjusted value) of TTC.

Guidance quality analyzer 208 is configured to check if the speed guidance (of speed guidance combiner unit 216) is sufficiently low to prevent a further speed decrease (see step 306 in FIG. 3). A further speed decrease from the initial speed guidance indicates a failure to achieve the goal of smoothing traffic flow. To avoid that and to decrease the speed guidance, TTC should be increased. The speed guidance is decreased by increasing the TTC value, because the reaction to changes of the followed vehicle speed is earlier and stronger. The input to analyzer 208 is the self-vehicle speed and the output is a third adjustment (and adjusted value) of TTC.

Vehicle ahead speed analyzer 210 is configured to check if the vehicle ahead increased its speed while the self-vehicle recommendation is still set to a low speed. Keeping the speed guidance unnecessarily low will slow down the traffic. To avoid that, TTC should be decreased. The inputs to analyzer 210 are the self-vehicle speed and the vehicle ahead speed, as measured by vehicle sensors 224, and the output is a fourth adjustment (and adjusted value) of TTC. Details on the calculation of these TTC adjustments are gives in the description of FIG. 3 below. Note that each adjustment of the TTC may be in the same direction (i.e. additive), or some adjustments may be in different directions. That is, the sign of each adjustment in Eq. 1 may be positive or negative.

The calculations of the TTC adjustments may be done in parallel, serially or in a mixed more (some in parallel and some serially). The four analyzers (204, 206, 208 and 210) provide the calculated TTC adjustments to traffic-aware speed guidance unit 212, which is configured to calculate a combined TTC using Eq. 1:

$$\text{Combined TTC} = \text{current TTC} + \text{driver compliance TTC adjustment} + \text{road speed fluctuation TTC adjustment} + \text{guidance quality TTC adjustment} + \text{vehicle ahead speed TTC adjustment} \quad (1)$$

In some scenarios, fewer than all four analyzers may be used to provide input to/set the combined TTC value. For example, when the ACC is activated (e.g. in case the driver does not control the vehicle speed or if the self-vehicle is autonomous), driver compliance analyzer 204 is not operative. Traffic-aware speed guidance unit 212 uses the calculated TTC, the speed of the followed vehicle as received over V2X, and the speed of the self-vehicle, to calculate recommended target speed 226. Speed guidance combiner unit 216 selects the lowest speed guidance as calculated by units 212 and 214.

FIG. 3 illustrates a flow chart of a method for traffic-aware V2X speed guidance disclosed herein. The operation begins at step 300 after a V2X message from the followed vehicle is received by the self-vehicle. The message is expected to be received every 100 mS. V2X communication unit 202 receives and parses all messages, and filters all messages except those arriving from the followed vehicle. The message includes among others the followed vehicle speed. Next, in step 302, driver compliance analyzer 204 is configured to calculate a driver compliance TTC adjustment based on driver compliance. This step is operative only when the driver controls the vehicle speed, i.e. when ACC is deactivated. The driver receives speed guidance notification from speed guidance combiner 216, either visually or audibly, and is expected to adjust the vehicle speed. Three events are identified by analyzer 204: late driver speed reduction following a guidance, gap between the speed guidance and the actual vehicle speed ("speed gap"), and driver speed increase before guidance speed increase. Any such event decreases the TTC, so the guidance will be looser (i.e. the guidance will arrive later and a higher speed will be recommended). The TTC reduction is relative to the amplitude of the event, meaning slower driver speed reduction, higher speed gap, and earlier speed increase will decrease TTC more. An exemplary formula for calculation of the driver compliance TTC adjustment is:

$$\text{Driver compliance TTC adjustment} = \text{Max}[0, \text{Vehicle speed} - \text{target speed}(t-1\ \text{sec})]/10 \quad (2)$$

where target speed(t−1 sec)] is the value of target speed 226 as measured 1 second ago.

Next, in step 304, road speed fluctuation analyzer 206 is configured to calculate a road speed fluctuation TTC adjustment. This step measures the stability of the speed of vehicles on road, and based on that, adjusts the TTC. The more stable the speed, the more likely that vehicles are keeping safe distance, and TTC can be smaller. Similarly, the greater the variance in speed, the more likely that vehicles are driving aggressively, and TTC should be higher for greater traffic smoothing. Previous values of speed are stored and compared with current values. The absolute values of the speed changes of all possible sources (e.g. self-vehicle speed, vehicle ahead speed, and followed vehicle speed) are incremented:

$$\text{Road speed fluctuation TTC adjustment} = [\text{abs(self-vehicle speed change)} + \text{abs(followed vehicle speed change)} + \text{abs(vehicle ahead speed change)}]/\text{calibration factor} - \text{constant drop} \quad (3)$$

The calibration factor is typically 4. The constant drop, for example 0.025, aims to decrease TTC while the speed is stable.

Next, in step 306, guidance quality analyzer 208 is configured to calculate a guidance quality TTC adjustment. If the self-vehicle speed is decreased because the initial speed guidance was too high, the TTC is increased, to lower the speed guidance. Several detection schemes for the decrease in self-vehicle speed can be applied. An exemplary scheme may include identifying periods of stable speed, as indicated by a small difference between maximal and minimal speed in a period, for example a 2 km/h gap in a 1 second period, validating that the stable speeds are dropping, and then detecting a speed decrease. In that case, the TTC is increased by the gap between current speed and last stable speed divided by a constant, for example 3, so the higher the speed drop, the higher TTC is increased.

The braking of the followed vehicle will eventually cause the vehicle ahead to decrease speed as well. This represents "slowdown". After the followed vehicle speed had increased, the vehicle ahead will increase the speed as well.

Next, in step 308, vehicle ahead speed analyzer 210 is configured to calculate a vehicle ahead speed TTC adjustment based on the speed of the vehicle ahead. If the vehicle ahead increases speed after the slowdown, while the guidance is kept at low speed, then the TTC should be decreased to end the speed guidance earlier. Several schemes can be applied. An exemplary scheme may include identifying that a guidance speed is increasing (for example by comparing the average speed in the last second with the average speed in between 2 second to 1 second ago), and comparing it to a past speed of the vehicle ahead t secs (for example 1 sec) before. The gap indicates how early the vehicle ahead increased the speed before the self-vehicle. TTC is decreased by the speed gap divided by a constant, for example 4 to obtain a vehicle ahead speed TTC adjustment.

In step 310, the calculated TTC adjustments are used to calculate a combined TTC using Eq. 1 above. Then in step 312, a new (updated) speed guidance is calculated based on the combined TTC. Conventional safety algorithms provide an alert when an accident is imminent, for example, 2-3 seconds ahead. Here, the speed guidance calculation applies a much longer horizon, typically bounded between 20 and 100 seconds ahead. The goal is not to prevent accidents, because during this long horizon many different events may occur on the road, and from a safety perspective anything above 5 seconds ahead is irrelevant. The goal is to predict imminent upcoming speed changes that can lead to a significant slowdown. An exemplary calculation may be as follows:

Speed guidance=Distance between following and followed vehicles/TTC+followed vehicle speed   (4)

where the TTC is the value from step 310. The operation ends at step 314.

Figure 4A:
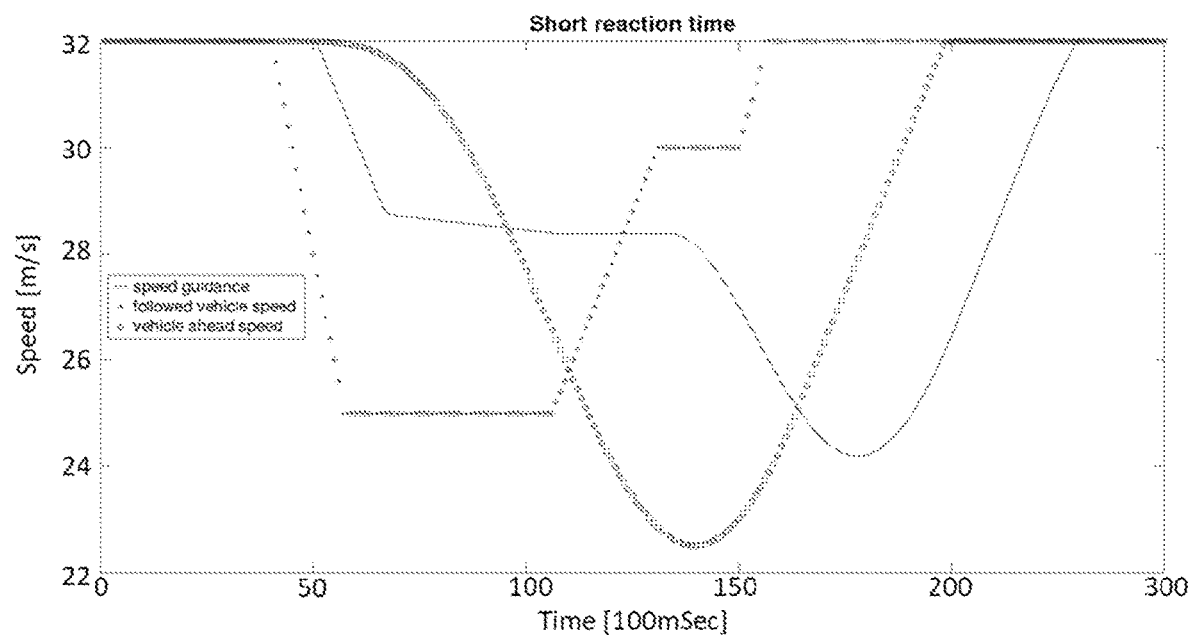
FIGS. 4A-4C illustrate graphs of speed guidance in different TTC values.
Figure 4B:
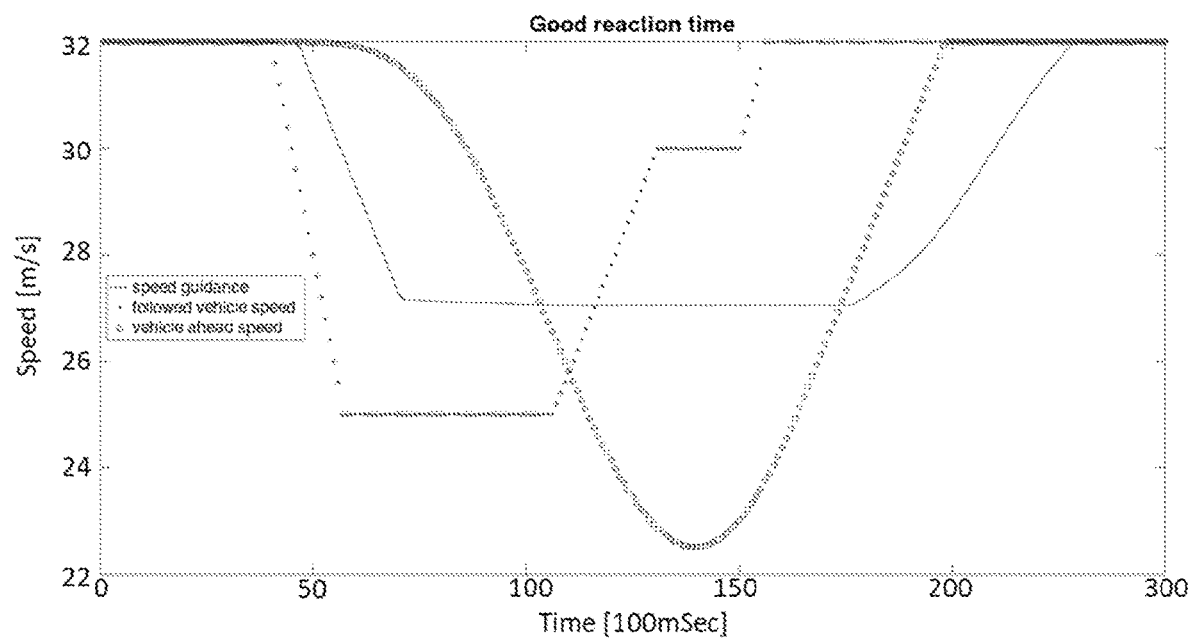
Figure 4C:
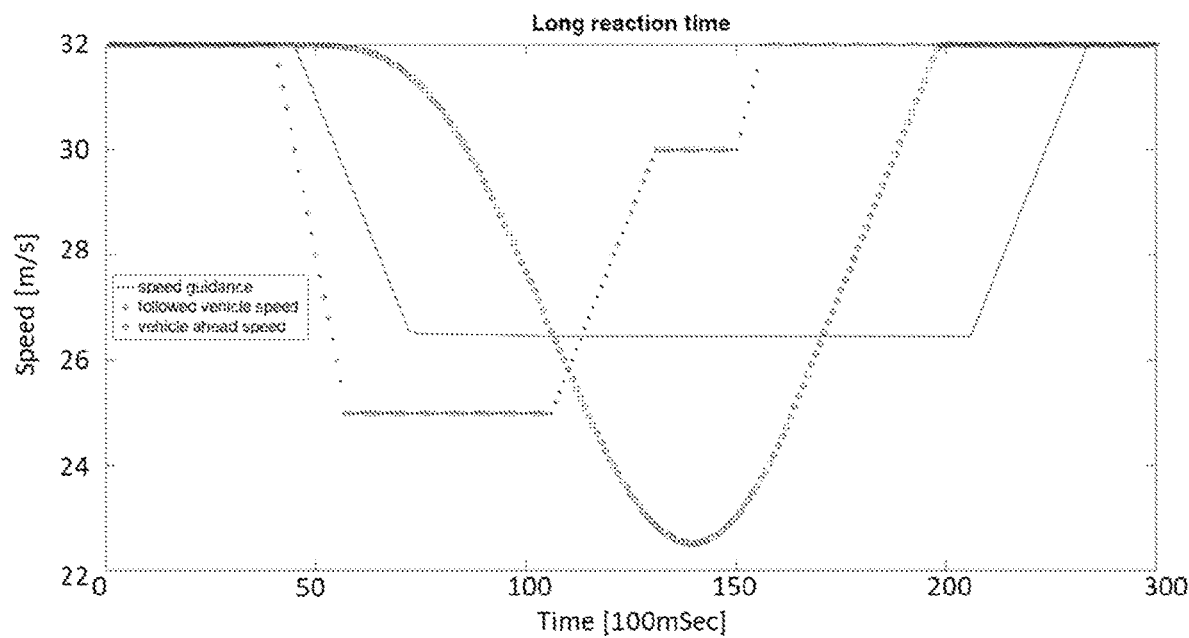

Graphs of speed guidance for different TTC values are illustrated in FIGS. 4A-C. In all graphs, the speed of followed vehicle 102 is marked with +. The simulated speed is decreased and after 8 seconds increased. The speed of vehicle 106, considered as the vehicle ahead, is marked with O. This speed is decreasing below the speed of followed vehicle 102, and for a longer period. Vehicle 108 is the self-vehicle, (and following vehicle). Its guided speed is marked with a solid line.

The first example, FIG. 4A, illustrates the guidance when the TTC is fixed to a relatively short value (within the exemplary range of 20-100 seconds mentioned above) of 40 seconds. The speed guidance is not sufficiently low, and around t=14 seconds (140 ticks of 100 mSec) the speed drops significantly. The second example, FIG. 4B, illustrates the guidance when the TTC is fixed to 70 seconds. The speed does not drop below the initial recommended speed, and the speed increase after the braking event begins at the same time as the speed increase of the vehicle ahead. The third example, FIG. 4C, illustrates the guidance when the initial TTC is fixed to 100 seconds. The speed recommendation is lower than in FIG. 4A and FIG. 4B, but more importantly, the recommendation is kept low long after the vehicle ahead speed had increased. These graphs illustrate the need to balance well the TTC for optimal traffic flow.

Figure 5A:
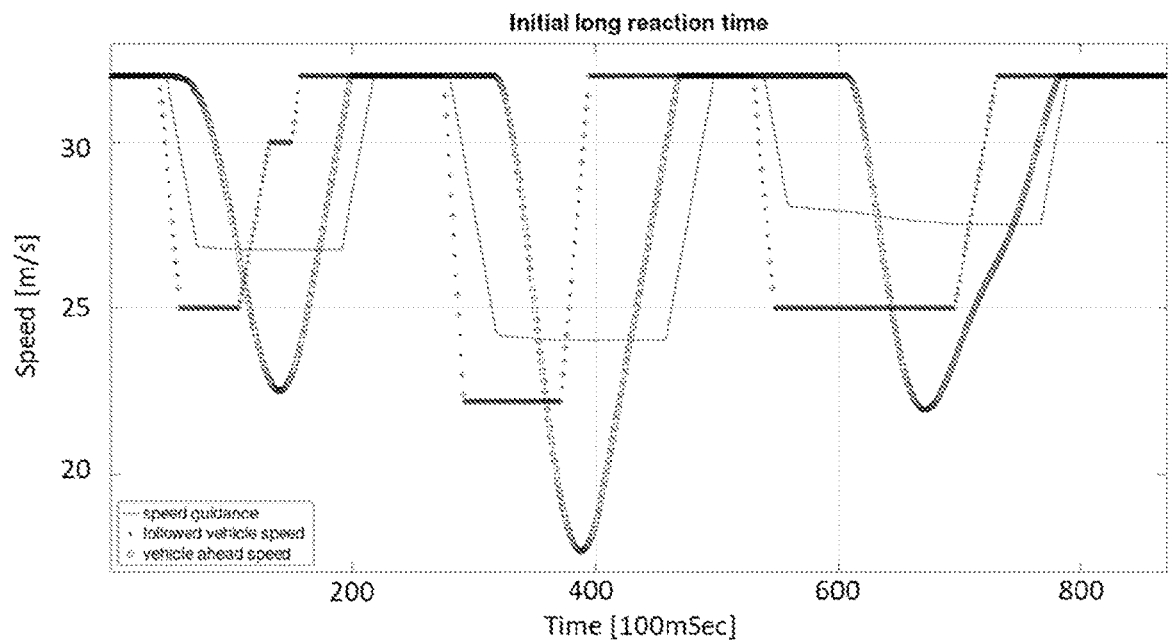
FIGS. 5A-5D illustrate graphs of speed guidance and TTC under different initial TTC conditions.
Figure 5B:
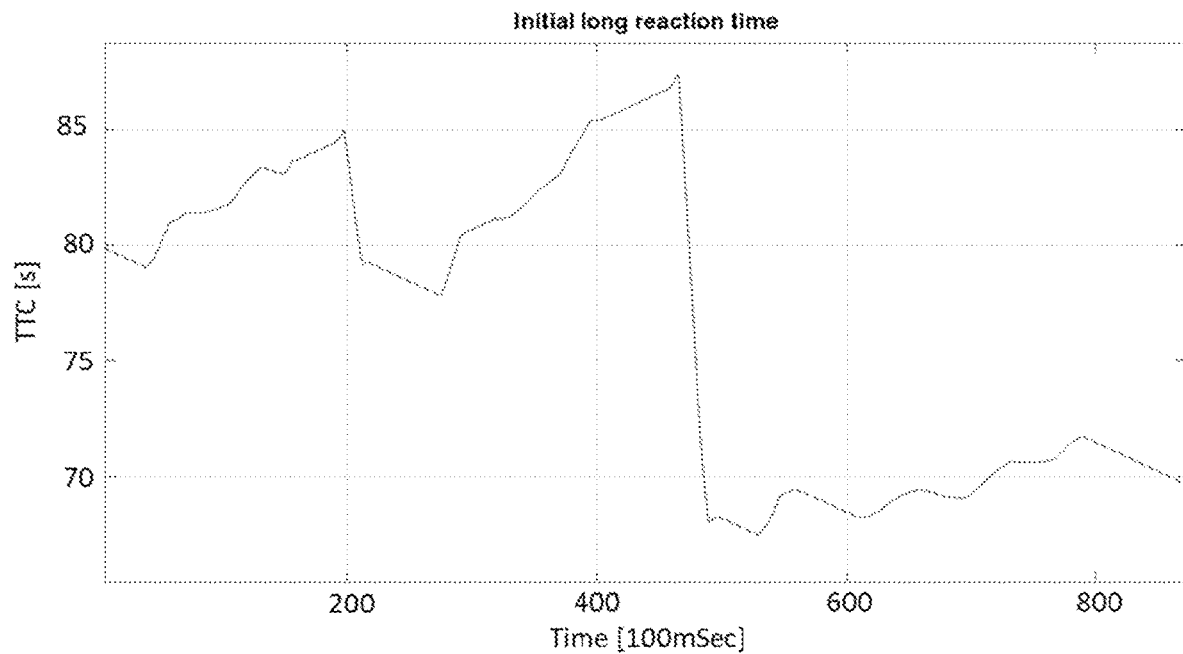
Figure 5C:
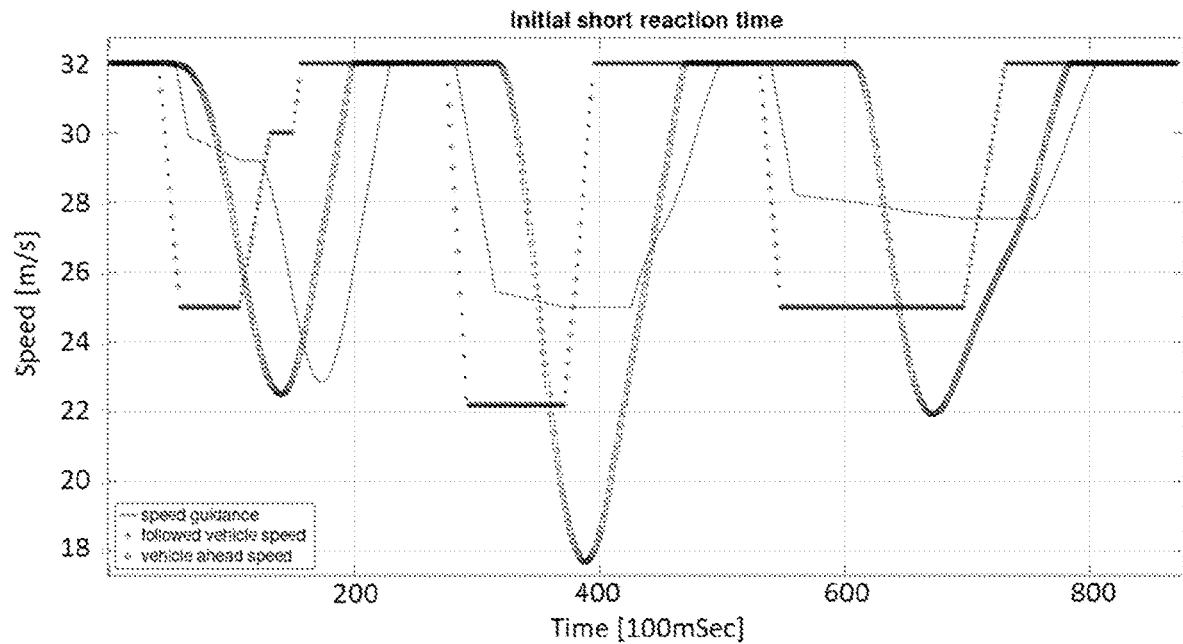
Figure 5D:
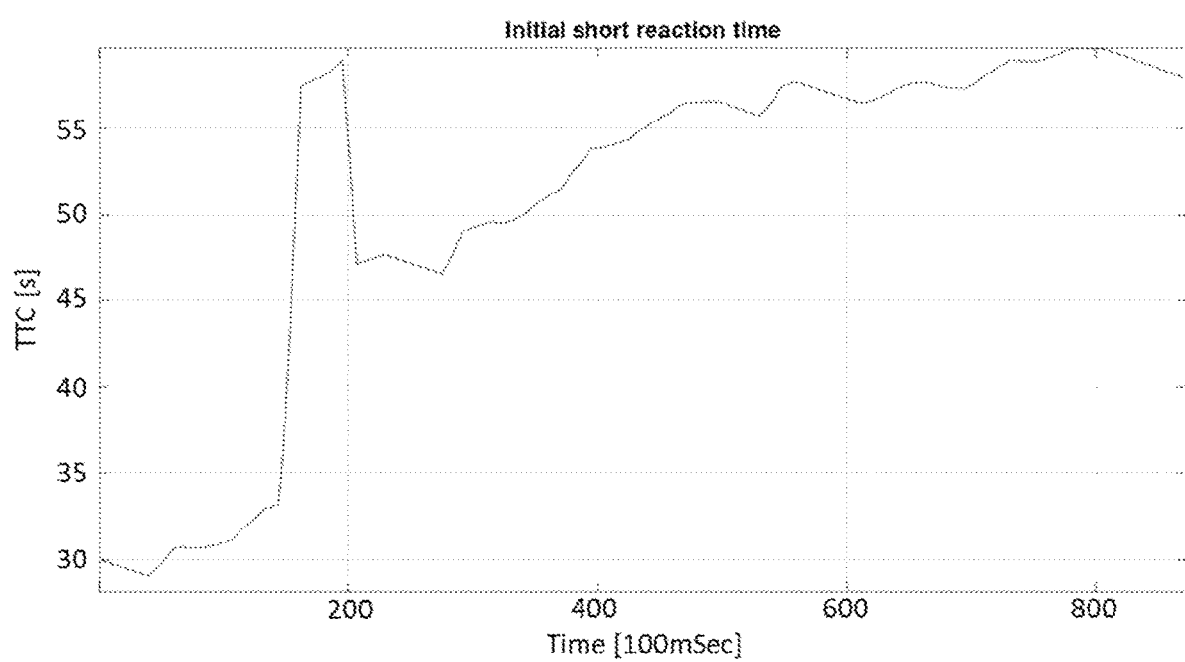

Graphs of speed guidance and TTC for different initial TTC conditions are illustrated in FIGS. 5A-D. FIGS. 5B and 5D show the convergence of TTC to a similar value despite different initial TTC values. FIG. 5B illustrates TTC change over time. The initial TTC value (at t=0) is 80 sec and the final TTC value is 70 sec, while FIG. 5D illustrates a simulation where TTC initial value is 30 sec and final is 60 sec. The followed vehicle, 102, decreases speed 3 times during the simulation. During the first speed decrease, the speed recommendation of the short initial TTC value is too high, leading to a major speed decrease in FIG. 5C of around t=14 seconds. Consequently, TTC is increased to nearly 60 sec in FIG. 5D. The TTC of FIG. 5D is adjusted a bit more by the other analyzers, such as by road speed fluctuation analyzer 206, but those adjustments are relatively small. The largest change in high initial value TTC, FIG. 5B, occurs at t=50 seconds, after the second braking event, when the self-speed increase is lagging the speed increase of the vehicle ahead. TTC is decreased from 82 sec to 68 sec.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Some stages of the aforementioned methods may also be implemented in a computer program for running on a computer system, at least including code portions for performing steps of the relevant method when run on a programmable apparatus, such as a computer system or enabling a programmable apparatus to perform functions of a device or system according to the disclosure. Such methods may also be implemented in a computer program for running on a computer system, at least including code portions that make a computer execute the steps of a method according to the disclosure.

The computer program may be stored internally on non-transitory computer readable media. All or some of the computer program may be provided on a computer readable medium permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:

1. A method, comprising: in a traffic environment that includes a followed vehicle and a self-vehicle that acts as a following vehicle,
analyzing, by a processor in a vehicle control apparatus in the self-vehicle, values and change patterns of a plurality of speed inputs to obtain analyzed values, wherein a speed input of the followed vehicle is received through vehicle-to-everything (V2X) communications;
for each analyzed value, calculating by the processor, a respective time to collision (TTC) adjustment, wherein the respective TTC adjustment is computed by a guidance quality analyzer that increases a TTC to lower a speed guidance of the self-vehicle when the self-vehicle speed is decreased relative to a prior speed guidance;
calculating, by the processor, a combined TTC between the self-vehicle and the followed vehicle using the TTC adjustments;
based on the combined TTC, calculating by the processor, a new speed guidance for the self-vehicle; and providing the new speed guidance to an advanced driving system (ADAS) in the self-vehicle to automatically control the speed of the self-vehicle responsive to the new speed guidance.

2. The method of claim 1, wherein the plurality of speed inputs includes a speed of the self-vehicle and a speed of a vehicle ahead.

3. The method of claim 2, wherein the speed of the vehicle ahead is measured by sensors of the self-vehicle.

4. The method of claim 1, wherein the calculating a respective TTC adjustment includes calculating a driver compliance TTC adjustment.

5. The method of claim 1, wherein the calculating a respective TTC adjustment includes calculating a road speed fluctuation TTC adjustment.

6. The method of claim 1, wherein the calculating a respective TTC adjustment includes calculating a vehicle ahead speed TTC adjustment.

7. An apparatus installed in a self-vehicle acting as a following vehicle vs. a followed vehicle, comprising:
a vehicle-to-everything (V2X) communication unit;
a traffic-aware speed guidance unit that includes:
a first analyzer implemented in a processor and configured to analyze stability of road speed on a road and to calculate a road speed fluctuation time to collision (TTC) adjustment using at least one speed input received from the followed vehicle through V2X communications,
a second analyzer implemented in the processor configured to analyze a speed guidance and to calculate a guidance quality TTC adjustment to increase a TTC to lower a speed guidance of the self-vehicle when the self-vehicle speed is decreased relative to a prior speed guidance, and
a third analyzer implemented in the processor configured to analyze a speed of the self-vehicle and a speed of the vehicle ahead and to calculate a vehicle ahead speed TTC adjustment;
a speed guidance combiner unit executed by the processor and configured to calculate a combined TTC between the self-vehicle and the followed vehicle using at least some of the TTC adjustments, and to calculate a new speed guidance of the self-vehicle based on the combined TTC; and
means to provide the new speed guidance to an advanced driving system (ADAS) in the self-vehicle to automatically control the speed of the self-vehicle responsive to the new speed guidance.

8. The apparatus of claim 7, further comprising a fourth analyzer implemented in the processor and configured to analyze the self-vehicle speed and a target speed and to calculate a driver compliance time-to-collision (TTC) adjustment.

9. The apparatus of claim 8, further comprising an Adaptive Cruise Control (ACC) unit for providing ACC speed guidance to the speed guidance combiner unit.

10. The apparatus of claim 7, wherein the at least some of the TTC adjustments used by the speed guidance unit include the road speed fluctuation TTC adjustment.

11. A non-transitory computer-readable medium including instructions executed by a processor in a self-vehicle that acts as a following vehicle to a followed vehicle, to perform a method comprising:
analyzing, by the processor, values and change patterns of a plurality of speed inputs to obtain analyzed values, wherein a speed input of the followed vehicle is received through vehicle-to-everything (V2X) communications;
for each analyzed value, calculating by the processor, a respective time to collision (TTC) adjustment, wherein the respective TTC adjustment includes calculating a guidance quality TTC adjustment to increase a TTC to lower a speed guidance of the self-vehicle when the self-vehicle speed is decreased relative to a prior speed guidance;
calculating, by the processor, a combined TTC between the self-vehicle and the followed vehicle using the TTC adjustments;
based on the combined TTC, calculating, by the processor, a new speed guidance for the self-vehicle; and
providing the new speed guidance to an advanced driving system (ADAS) in the self-vehicle to automatically control the speed of the self-vehicle responsive to the new speed guidance.

12. The non-transitory computer-readable medium of claim 11, wherein the plurality of speed inputs includes a speed of the self-vehicle and a speed of a vehicle ahead.

13. The non-transitory computer-readable medium of claim 11, wherein the speed of the vehicle ahead is measured by sensors of the self-vehicle.

14. The non-transitory computer-readable medium of claim 11, wherein the calculating a respective TTC adjustment includes calculating a driver compliance TTC adjustment.

15. The non-transitory computer-readable medium of claim 11, wherein the calculating a respective TTC adjustment includes calculating a road speed fluctuation TTC adjustment.

16. The non-transitory computer-readable medium of claim 11, wherein the calculating a respective TTC adjustment includes calculating a vehicle ahead speed TTC adjustment.

* * * * *